United States Patent [19]

Jones

[11] Patent Number: 5,975,892
[45] Date of Patent: Nov. 2, 1999

[54] PNEUMATIC FLASH CALCINER THERMALLY INSULATED IN FEED STORAGE SILO

[76] Inventor: Michael Andrew Jones, 3915 N. Campbell Ave., #2-62, Tucson, Ariz. 85719

[21] Appl. No.: 09/199,908

[22] Filed: Nov. 25, 1998

[51] Int. Cl.$^6$ .................................................. F27B 15/00
[52] U.S. Cl. ................................ 432/58; 432/106; 432/14
[58] Field of Search ................................. 432/58, 106, 14

[56] References Cited

U.S. PATENT DOCUMENTS

| | | | |
|---|---|---|---|
| 3,862,294 | 1/1975 | Engelhart et al. | 423/155 |
| 4,118,177 | 10/1978 | Weber et al. | 432/14 |
| 4,483,831 | 11/1984 | Schmidt et al. | 423/175 |
| 4,747,773 | 5/1988 | Predescu et al. | 432/14 |
| 4,932,862 | 6/1990 | Kettenbauer | 432/58 |
| 5,132,102 | 7/1992 | Cohen et al. | 423/23 |
| 5,174,749 | 12/1992 | Jorgensen et al. | 432/106 |
| 5,260,041 | 11/1993 | Cohen et al. | 423/175 |

*Primary Examiner*—Teresa Walberg
*Assistant Examiner*—Jiping Lu
*Attorney, Agent, or Firm*—Antonio R. Durando

[57] ABSTRACT

A self-contained calcination plant is enclosed in a feed-storage silo. The plant consists of a vertical reactor, a separation cyclone and a pair of heat exchangers connected by appropriate piping and immersed in the feed material stored in powdery form in the silo. A positive displacement blower creates an air stream that is preheated in one of the heat exchangers and fed in part to a gas burner and in part to a feed pipe at the bottom of the reactor. The feed material is kept in a fluidized state in the silo by air heated in the other heat exchanger and blown upward from the bottom of the storage compartment, from where the material is dropped into the feed pipe through rotary valves prior to injection into the reactor. The feed pipe is connected tangentially to the reactor so as to produce an upward swirling flow around the burner's flame. The fluidized reaction products are passed through a cyclone to separate the calcined oxides from the hot gases, which are then fed serially through the heat exchangers to preheat the process air used for the blower and the storage compartment. The solid product is recovered from the bottom of the cyclone. The entire plant is enclosed in the silo and, during operation, all units are immersed in the fluidized hot feed material that provides excellent heat transfer among all components and a sufficiently uniform temperature in the reactor to produce optimal calcination.

19 Claims, 3 Drawing Sheets

PNEUMATIC FLASH CALCINER THERMALLY INSULATED IN FEED STORAGE SILO

BACKGROUND OF THE INVENTION

1. Field of the Invention

This invention pertains to the field of calcination of inorganic minerals and materials. In particular, it relates to a self-contained, thermally insulated flash calcination unit that promotes reaction temperature control and reduces energy consumption.

2. Description of the Related Art

Carbonate and hydrate inorganic minerals, such as limestone, dolomite, magnesite, brucite, and other materials, are subjected to calcination to produce oxides for industrial utilization. The process of calcination has been carried out in a variety of vessels, ranging from rotary kilns to fluidized-bed reactors, with a high input of energy dedicated to maintaining the relatively high temperature required for calcination.

For instance, limestone is converted to calcium oxide and carbon dioxide in an endothermic decomposition reaction that is carried out optimally at a temperature of at least 1,700° F. The required heat is typically provided by gas burners in the reaction zone. The prior art discloses several types of equipment for carrying out the calcination of limestone and similar minerals, all directed at improving various aspects of the process. Such inventions are described, for example, in U.S. Pat. Nos., 3,862,294, 4,118,177, 4,747,773, 4,483,831, 4,932,862, 5,132,102, 5,174,749 and 5,260,041.

For convenience, limestone is used in the description of the present invention because of its importance and because it is typical of the feed material subjected to calcination in prior-art processes. In flash calcination processes, limestone particles in a preheated fluid suspension are exposed to a high-temperature flame that activates and sustains the decomposition reaction. If the temperature in the reactor reaches levels above about 2,450° F., sintering of the particles may occur with a resulting degraded product. If the temperature declines below the optimal range of about 1,700 to 2,450° F. prior to completion of the reaction, the quality of the product is again degraded by the presence of unreacted material. Thus, optimal reaction conditions are present when the reactive bed is maintained within the desired temperature range throughout the reactor bed.

This result has been difficult to achieve in all prior-art reactors because of the complex thermal effects produced by the combined dynamics of the fluidized bed, reaction thermodynamics, and heat transfer occurring within the reactor and with the surrounding environment. When the flame temperature is maintained at an optimal level to initiate the reaction, the temperature downstream tends to decrease too rapidly to support full conversion. If, on the other hand, a higher flame temperature is used to provide sufficient heat to maintain an adequate temperature throughout the reactor, some initial sintering of the feed material is found to occur, which is undesirable for product quality. Therefore, there is still a need for improved apparatus that produces more uniform temperature conditions through the reactor than are currently attainable with known equipment.

BRIEF SUMMARY OF THE INVENTION

The primary goal of this invention is to provide uniform temperature conditions during the decomposition reaction of a calcination process in order to prevent sintering of the mineral particles and yield a uniformly oxidized product.

Another important goal is a method and apparatus for continuously calcining finely divided material in an enclosed system utilizing efficient heat recovery techniques.

Another goal is a calcination plant wherein the solid feed material is entrained by an air stream and carried pneumatically and continuously through the system.

Still another objective is a system that reduces the need for refractory material to prevent heat losses from the hot operating units of the calcination plant.

Finally, an objective of the invention is a system that utilizes components already available in the process industry, which are modified only to the extent necessary to carry out the foregoing objectives.

Therefore, according to these and other objectives, the present invention consists of a self-contained calcination plant enclosed in a feed-storage silo. The plant consists of a vertical reactor, a separation cyclone and a pair of heat exchangers connected by appropriate piping and immersed in the feed material stored in powdery form in the silo. A positive displacement blower creates an air stream that is preheated in one of the heat exchangers and fed in part to a gas burner and in part to a feed pipe at the bottom of the reactor. The feed material is kept in a fluidized state in the silo by air heated in the other heat exchanger and blown upward from the bottom of the storage compartment, from where the material is dropped into the feed pipe through rotary valves prior to injection into the reactor. The feed pipe is connected tangentially to the reactor so as to produce an upward swirling flow around the burner's flame. The fluidized reaction products are passed through a cyclone to separate the calcined oxides from the hot gases, which are then fed serially through the heat exchangers to preheat the process air used for the burner and the storage compartment. The solid product is recovered from the bottom of the cyclone. The entire plant is enclosed in the silo and, during operation, all units are immersed in the fluidized hot feed material that provides excellent heat transfer among all components and a sufficiently uniform temperature in the reactor to produce optimal calcination.

Various other purposes and advantages of the invention will become clear from its description in the specification that follows. Therefore, to the accomplishment of the objectives described above, this invention consists of the features hereinafter illustrated in the drawings and fully described in the detailed description of the preferred embodiment and particularly pointed out in the claims. However, such drawings and description disclose but some of the various ways in which the invention may be practiced.

DESCRIPTION OF THE PREFERRED EMBODIMENTS OF THE INVENTION

Figure 1:
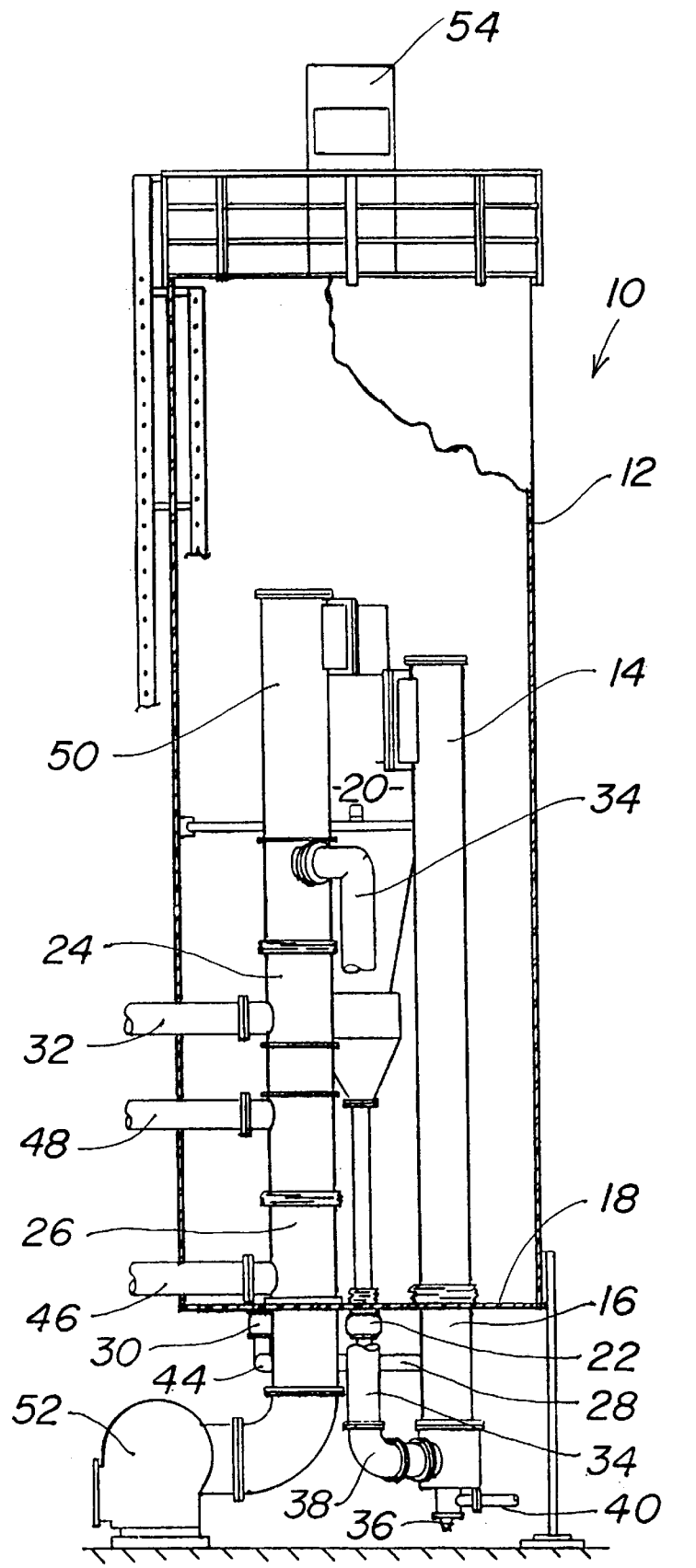
FIG. 1 is a schematic elevational side view of a calcination plant according to the invention, shown as it would be seen with the front half of the silo cut out for visual access.
Figure 2:
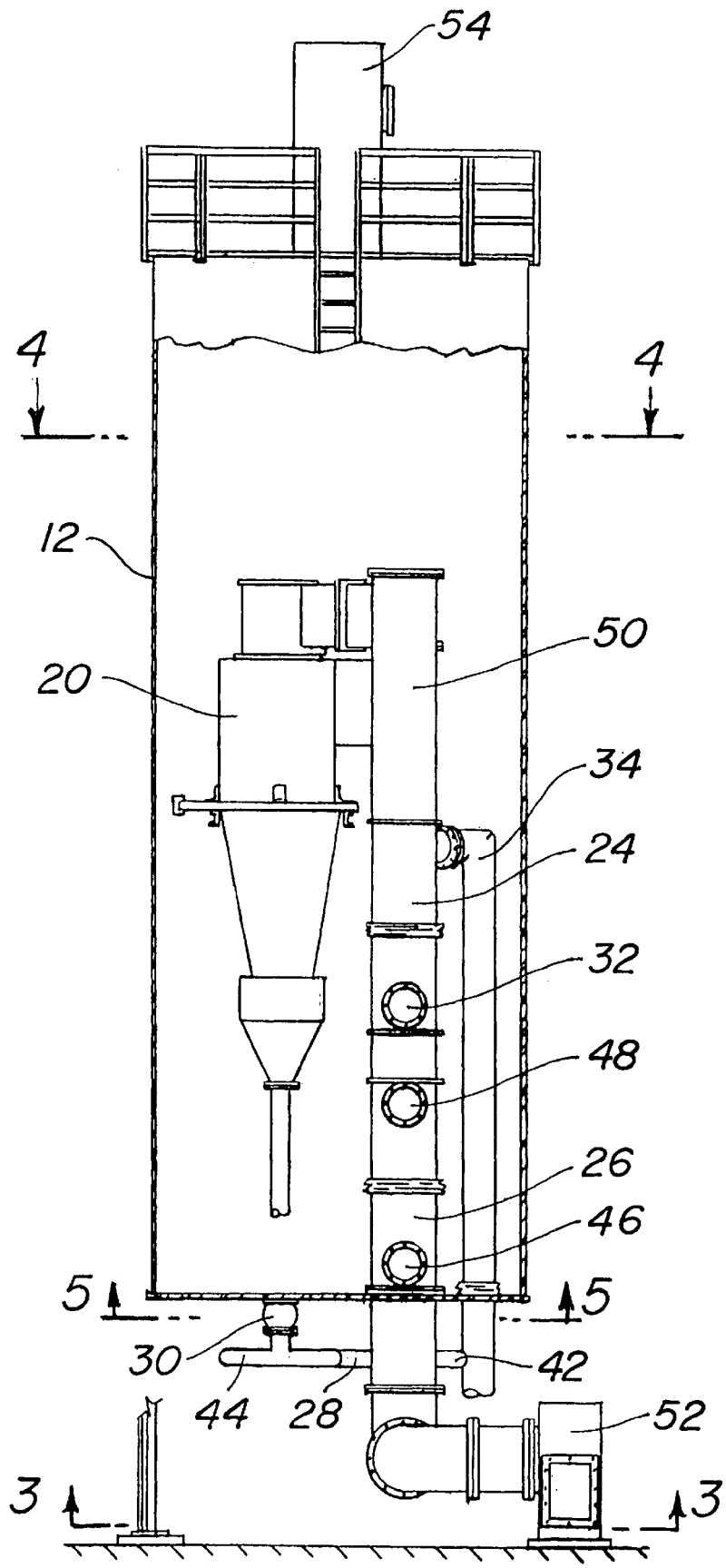
FIG. 2 is a schematic elevational view taken at 90 degrees from the view of FIG. 1, also seen with the corresponding front half of the silo mostly removed.
Figure 4:
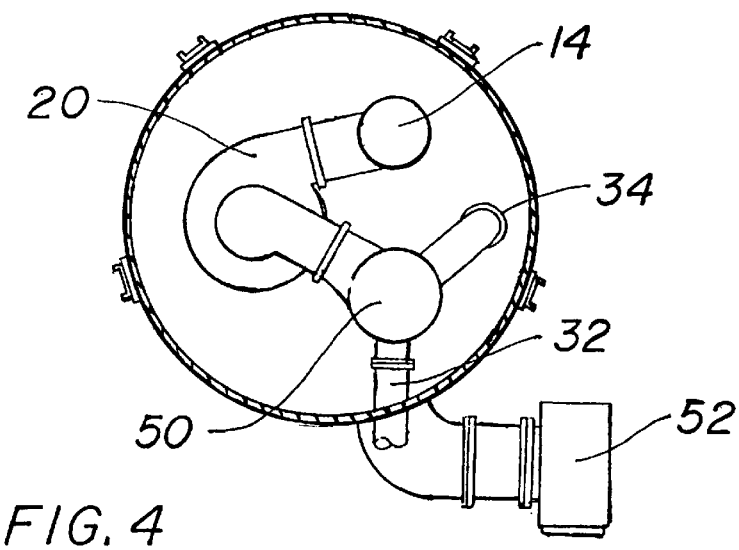
FIG. 4 is a top view of the plant as seen from line 4—4 in FIG. 2.
Figure 3:
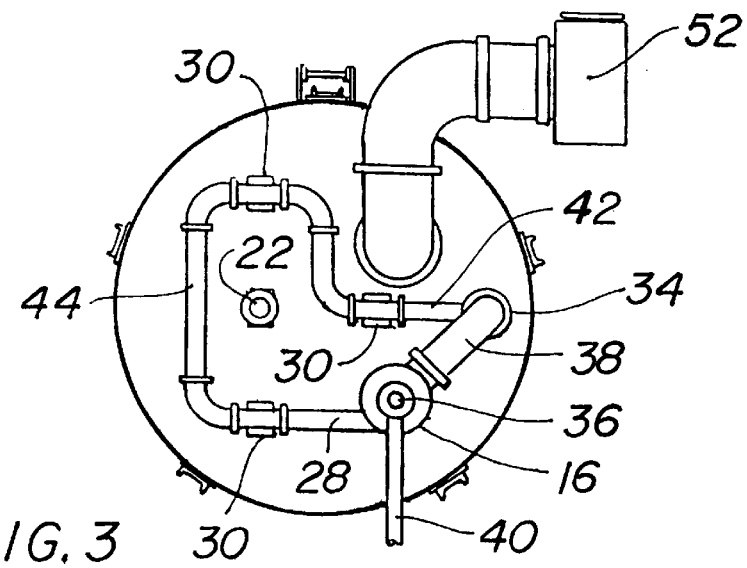
FIG. 3 is a bottom view of the plant as seen from line 3—3 in FIG. 2.
Figure 5:
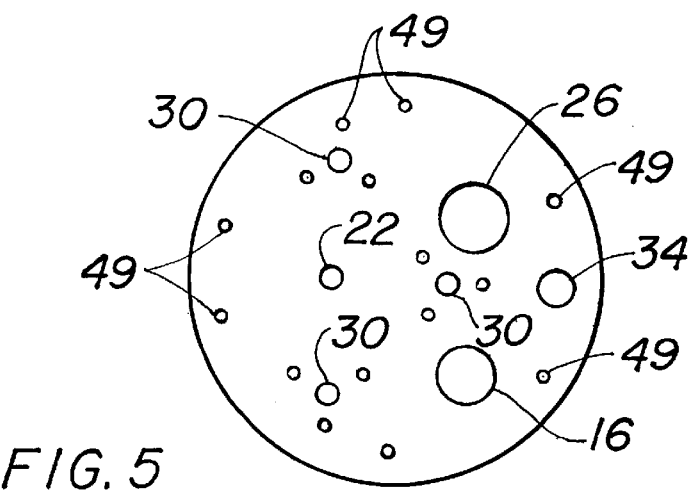
FIG. 5 is a bottom view of the base of the silo, as seen from line 4—4 in FIG. 2, shown to illustrate the location of piping, injection nozzles, and rotary valves connecting the interior with the underside of the silo.

The main aspect of this invention is the idea of enclosing substantially all operating units of a calcination plant inside the storage silo for the feed material and maintaining the material in a fluidized state to insulate the units and promote heat transfer between them, resulting in a more uniform temperature distribution throughout the plant and, in particular, within the reaction vessel. Referring to the drawings, wherein like reference numerals refer to like parts throughout, FIG. 1 is a schematic side view of a plant 10 according to the invention. FIG. 2 is an elevational view taken at 90 degrees with respect to FIG. 1. The operating units of the plant are substantially all enclosed in a storage silo 12, which is seen cut out in the figures for visual access to the components of the plant. The plant consists of a vertical reactor 14 placed with its bottom end 16 below the base 18 of the silo and connected at the top to a separation cyclone 20 (see also FIG. 4). The solid oxides separated in the cyclone are recovered through a rotary valve 22 located at its bottom, while the gases are exhausted from the top of the cyclone through two heat exchangers 24 and 26 provided to pre-heat process air. The reactor feed consists of a fluidized stream of solid particles fed from the silo into a reactor feed pipe 28 (better seen in the bottom view of FIG. 3) through multiple rotary valves 30 that provide fine control to the solid/air ratio in the feed. The feed air stream is provided by one (or more, if necessary) positive displacement blower (not shown in the figures) that pumps atmospheric air into the inlet pipe 32 of the primary heat exchanger 24 for pre-heating. The hot air from the exchanger's outlet pipe 34 is split into two separate streams to provide combustion air and conveying air for the system. The combustion air is fed to the burner 36 through a pipe 38 at the bottom of the reactor 14, where combustion gas is fed through a separate line 40 from an outside source. The conveying air is taken from the hot stream of the primary exchanger's outlet pipe 34 at a junction 42 below the base 18 of the silo. The air is circulated around the bottom of the silo in a pipe 44 accessible from the storage compartment through multiple rotary valves 30 (see FIGS. 3 and 5), which are used to mix the particulate solid feed with the air and create a fluidized feed stream for injection into the cylindrical bottom of the reactor through the tangential feed pipe 28. The burner 36 is mounted vertically in the calcining pipe to create an upward flame within the cyclonic feed region. The solid particles in the silo 12 are also kept relatively fluid by warm air that is first dried, then heated in the secondary heat exchanger 25, and finally introduced into the bottom of the silo to stir the particles and facilitate their removal through the rotary valves 30. Appropriate inlet and outlet heat-exchanger piping 46,48, an air dryer unit (not shown) and injection nozzles 49 (shown in FIG. 5) are provided according to well known fluidized-bed technology. Alternatively, hot exhaust gases can also be utilized to keep the silo material fluid.

The reaction products out of the reactor 14 are classified in the cyclone 20, yielding a solid oxide product removed from the bottom of the unit through a rotary valve 22 and a hot gaseous product removed from the top. The hot gases are then passed through the primary and secondary heat exchangers 24 and 26 by means of an appropriately sized conduit 50. The exhaust gases are then removed from the unit and, with the aid of an exterior variable-speed draft fan 52, sent to a wet scrubber (not shown) before venting. The fan helps maintain an appropriate pressure drop across the system.

The raw material to be calcined is fed into the silo 12, preferably by pneumatic conveying, for storage and pre-heating. The feed material must be delumped and have approximately less than 15% moisture to remain free flowing in the silo. This may be accomplished by also utilizing pre-heated air from the secondary heat exchanger 26 located on the exhaust portion of the plant for conveying the particulate feed to the silo. Alternatively, hot exhaust gases could also be used. This air (or exhaust gas) is preferably blown through an air-swept cage mill (not shown) where the raw solid feed is delivered to contact the hot air and is delumped prior to entering the silo. This enables the feed material to be dried before entering the silo.

In addition, the air-swept cage mill also provides partial classification of the feed material to prevent oversize impurities from entering the system. Any foreign objects, such as gravel or debris, are collected in a hopper at the bottom of the cage mill for periodic removal. After transporting the particulate feed to the silo, the conveying air is filtered in a conventional bag filter 54 and vented to the atmosphere.

If necessary, an additional burner can be used in the solid feed system to the silo in conjunction with the preheated air from the secondary heat exchanger in order to increase the amount of drying that can be accomplished prior to storage of the material in the silo. For high-moisture feed materials, a portion of the hot and dry feed in the silo could also be returned and mixed with wet feed material to lower the overall moisture content. This practice may enable the resulting mixed feed to be dried and pneumatically conveyed when it might not otherwise be possible to do so.

As described, the high temperature components of the flash calciner of the invention are placed inside the silo, such that the feed material in storage envelops each unit. This design insulates the high temperature components and further preheats the raw material prior to its rotary-valve delivery to the feed pipe leading to the calcining reactor. The aeration provided at various points on the bottom of the silo helps to keep the solid feed material fluid and avoid inconsistent flow through the variable-speed rotary valves 30 located on the bottom of the silo. These valves can also be used to control the system temperature by adjusting the solid feed rate. As one skilled in the art could easily understand, every other parameter being constant, higher feed rates of solid particles produce lower system temperatures because of the endothermic character of the calcination reaction. correspondingly, lower feed rates produce higher system temperatures. Therefore, solid feed rate is a major parameter for controlling the operating temperature of the calcination process and it is important to size the rotary valves 30 such as to provide flexibility of operation.

The volume of air required for conveying and for combustion obviously depends on the mass of limestone material to be calcined. The required reaction heat is derived from the combustion of the air/fuel mixture delivered to the burner 36, preferably a low NOx unit. The combustion air is preheated to above 700° F. by the hot exhaust gases passing through the primary heat exchanger 24 located on the exhaust portion of the plant. The burner must be able to accommodate the temperature and volume swings of the preheated combustion air to ensure proper combustion air velocities through the burner orifices.

The pneumatic conveying system is made of pipe, or other forms of enclosed channel/conduit, and must be compatible in size with the positive displacement blower to move the combustion gases at sufficient velocity and pressure to keep the material in suspension for pneumatic transport throughout the system. For a particulate limestone feed having a particle size less than 20 mesh (60 mesh is optimal), a suitable entraining gas velocity is approximately 20 m/sec. As design operating temperatures vary, the size of the conveying system and optimal gas velocity would vary accordingly.

The reactor 14 consists of a high-temperature alloy, vertical pipe located inside the feed silo, operating at sufficiently high temperatures to calcine the feed material. The reaction zone may extend into the cyclone separator 20. As mentioned above, the feed material is discharged from the silo's storage compartment into the feed pipe 44 through rotary valves 30 and pneumatically conveyed tangentially into the calcining zone of the reactor 14, thus producing a cyclonic action that characterizes the flow of the fluidized reactants during calcination. In order for the decomposition reaction of limestone to take place, a reactor temperature of at least 1,700° F. must be maintained, possibly avoiding temperatures higher than 2,450° F. to prevent sintering. The heat required to reach and maintain these temperatures is provided first by the pre-heating steps and then by the gas burner in the reaction zone. The tangential flow of the feed into the calcining pipe provides the gradual blending of the feed material with the hot combustion gases, which results in avoidance of sintering of the feed material. The cyclonic action also increases the velocity of the fluidized particles for a given throughput and a given retention time in the reactor due to the spiral path that the material must follow. As a result, larger particles migrate closer to the pipe wall and travel more slowly than smaller particles, thereby enabling the complete and uniform calcination of such coarser feed material. At the same time, the cyclonic action causes the finer material, which is calcined more rapidly than coarser material, to exit the reactor at a greater rate, which is all consistent with obtaining a product of uniform quality.

The fuel source that is best suited for this application is natural gas, although a wide variety of fuels can be utilized. The proper air-to-gas ratio for proper combustion of natural gas is roughly 12 to 1. It is recommended to control the reactor temperature by using the solid-particle feed rate, rather than gas rate, because control of the temperature using fuel-to-air ratios may lead to inefficient fuel consumption and unacceptable emissions. Excess air entering the system with the raw material pneumatic feed can be useful when calcining material with organic impurities that require additional air for complete combustion. If necessary, additional fuel can be added to the air stream to compensate for any excess and to balance the air-to-fuel ratio to the desired value.

The calcination products exit the vertical calcining reactor 14 and travel through the high temperature cyclone 20, which is located in parallel to the calcining pipe. It is important to maintain calcination temperatures in the cyclone to avoid any adverse recarbonation of the solid oxide material prior to its separation from the combustion gases. Depending on the physical characteristics of the calcined material, it may be necessary to include a means for reducing calcined oxide buildup on the inner walls of the cyclone. This can be accomplished effectively with an alloy chain suspended from a swivel at the center of the cyclone discharge.

The calcined product is discharged at the bottom of the cyclone through the rotary valve 22, while the hot exhaust gases exit the top of the cyclone and then travel through the gas-to-air primary and secondary heat exchangers 24,26. These exchangers are also preferably located in parallel to the cyclone 20 and the calcining pipe 14. The primary heat exchanger 24 provides the initial cooling of the exhaust gases while preheating the feed air to the system. The secondary heat exchanger 26 further cools the exhaust gases while preheating the conveying air used to fill the silo and to fluidize the particles at the bottom of the silo. All of these components are located within the storage silo and completely surrounded with feed material, which provides the necessary heat transfer between the hot calcining components and the feed material to keep the entire system within a uniform and acceptable temperature range for optimal calcination. This arrangement also avoids the need for expensive refractory material to insulate the equipment.

The calcined oxide product, discharged from the cyclone through the rotary valve 22, can be mechanically or pneumatically conveyed to its destination. Alternatively, the calcined material can be hydrated immediately after discharge and the resultant slurry pumped to the end use point.

Thus, the present invention provides a self-contained, energy-efficient system for calcining particulate feed material in a continuous operation that features high-temperature operating units (calcining reactor, cyclone, heat exchangers) located inside the raw material silo for insulation and preheating, which eliminates the need for refractory insulation, and a high level of energy recovery from the heat exchangers used to preheat the feed and the conveying air to the silo. Because of its configuration, the calcining plant of the invention is suitable for modular construction and for skid-mounting, so that it can be easily assembled and moved. The placement of the multiple rotary valve feeders at the bottom of the silo permit maintenance without shutdown of the plant. Various types of burners can be used and easily switched to utilize a wide range of fuels (i.e., gas, fuel oil, coal). Because of its high resistance to thermal shock resulting from its concept of construction, the plant requires short start-up and shut-down times. If necessary, the option of mixing of the feed material with dry recycled feed material from the silo to lower the moisture content to a level sufficient for pneumatic conveying is easily implemented. Similarly, a supplemental burner can easily be introduced in conjunction with the preheated conveying air to increase the drying capacity of the system. Finally, as a result of its simplicity and high efficiency, the calcination plant of the invention is relatively inexpensive to construct and operate.

Blower size, fuel requirements, pipe and channel/conduit sizes, and similar manufacturing parameters for a specific product and a desired throughput are well within the design choices of those skilled in the art. Obviously, the actual system capacity will vary due to unpredictable variables such as heat loss, impurities, pressure, and retention time. However, adjustments can be made to obtain the desired capacities by changing the size, length, and even the number of burners in the system to compensate for these variables.

Various changes in the details, steps and components that have been described may be made by those skilled in the art within the principles and scope of the invention herein illustrated. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope embraced by any and all equivalent processes and products.

I claim:

1. A calcination plant for a particulate feed material comprising:

a storage silo for the feed material;

a calcination reactor;

a solid-gas separation unit;

and first means for fluidizing said particulate feed material from the silo and for sequentially conveying a resulting fluidized feed stream through the reactor and separation unit to produce a solid calcined product and a gaseous exhaust;

wherein said reactor and separation unit are enclosed in the storage silo and immersed in the particulate feed material stored therein.

2. The plant of claim 1, further comprising a first heat exchanger between said gaseous exhaust and a reactor air stream used for fluidizing the particulate feed material conveyed to the reactor.

3. The plant of claim 1, further comprising second means for fluidizing the particulate feed material prior to storage and for conveying a resulting fluidized feed stream to the storage silo.

4. The plant of claim 3, further comprising a second heat exchanger between said gaseous exhaust and a feed air stream used for fluidizing the particulate feed material conveyed to the silo.

5. The plant of claim 1, further comprising second means for fluidizing the particulate feed material prior to storage and for conveying a resulting fluidized feed stream to the storage silo; comprising a first heat exchanger between said gaseous exhaust and a reactor air stream used for fluidizing the particulate feed material conveyed to the reactor; and a second heat exchanger between said gaseous exhaust and a feed air stream used for fluidizing the particulate feed material conveyed to the silo.

6. The plant of claim 5, wherein said first and second heat exchangers are enclosed in the storage silo and immersed in the particulate feed material stored therein.

7. The plant of claim 1, wherein said solid-gas separation unit includes a cyclone.

8. The plant of claim 6, wherein said solid-gas separation unit includes a cyclone.

9. The plant of claim 1, wherein said calcination reactor has a substantially cylindrical bottom portion including a fuel burner and said fluidized feed stream is introduced tangentially in the bottom portion such as to produce a cyclonic flow through the reactor.

10. The plant of claim 9, wherein said calcination reactor has a substantially cylindrical bottom portion including a fuel burner and said fluidized feed stream is introduced tangentially in the bottom portion such as to produce a cyclonic flow through the reactor.

11. The plant of claim 1, wherein said first means for fluidizing said particulate feed material from the silo and for sequentially conveying a resulting fluidized feed stream through the reactor and separation unit comprises at least one positive displacement blower.

12. The plant of claim 10, wherein said first means for fluidizing said particulate feed material from the silo and for sequentially conveying a resulting fluidized feed stream through the reactor and separation unit comprises at least one positive displacement blower.

13. The plant of claim 11, wherein said first means for fluidizing said particulate feed material from the silo and for sequentially conveying a resulting fluidized feed stream through the reactor and separation unit further comprises at least one variable-speed draft fan for said gaseous exhaust.

14. The plant of claim 1, wherein said first means for fluidizing the particulate feed material from the silo comprises a least one rotary valve for delivering the feed material from the silo into a conduit to produce said fluidized feed stream.

15. The plant of claim 13, wherein said first means for fluidizing the particulate feed material from the silo comprises a least one rotary valve for delivering the feed material from the silo into a conduit to produce said fluidized feed stream.

16. The plant of claim 1, further comprising means for injecting a silo air stream into the silo in order to promote uniform flow of the feed material out of the silo.

17. The plant of claim 15, further comprising means for injecting a silo air stream into the silo in order to promote uniform flow of the feed material out of the silo.

18. The plant of claim 16, wherein said silo air stream is pre-heated by heat exchange with said gaseous exhaust.

19. The plant of claim 17, wherein said silo air stream is pre-heated by heat exchange with said gaseous exhaust.

* * * * *